Jan. 12, 1965 E. H. LIIBBE 3,165,329
GOLF CART APPARATUS
Filed Nov. 12, 1963 2 Sheets-Sheet 1

INVENTOR
ELMER H. LIIBBE
BY
W. Robert Henderson
ATTORNEY

INVENTOR
ELMER H. LIIBBE
BY
N. Robert Henderson
ATTORNEY

United States Patent Office 3,165,329
Patented Jan. 12, 1965

3,165,329
GOLF CART APPARATUS
Elmer H. Liibbe, 1811 62nd St., Des Moines, Iowa
Filed Nov. 12, 1963, Ser. No. 322,717
4 Claims. (Cl. 280—36)

This invention pertains to a unitary golf cart and bag having separate wheel devices for rolling the cart over the ground, and where the wheel devices are movable from ground engaging positions to non-ground engaging positions closely adjacent the bag proper for storage purposes. More particularly, the invention pertains to a brace arrangement combined with the wheel devices to maintain the wheel devices against lateral movement relative to the frame of the cart, thereby lengthening the life of the wheel devices and providing continued true tracking thereof.

It is therefore an object of this invention to provide an improved golf cart.

Another object of this invention is to provide an improved golf cart framework.

Yet another object of this invention is to provide an improved unit for releasably bracing separate, laterally movable wheel devices against lateral movement during use of said bracing unit.

It is still another object of this invention to provide a bracing unit for maintaining separately movable golf cart wheels against individual and relative lateral movement, while permitting slight individual and relative vertical and longitudinal movement thereof.

Another object of this invention is to provide a bracing unit which substantially embraces simultaneously the shafts of the wheel devices of a golf cart, providing a contacting solid embrace on the adjacent inner portions of the shafts, and a flexible, releasable embrace on the outer portions of the shafts.

Still another object of this invention is to provide a bracing unit capable in combined co-action with a golf cart frame of attaining the above designated objectives which is economical of manufacture, simple and rugged in structure, and effective in use.

These objects and other features and advantages of this invention will become readily apparent upon reference to the following description when taken in conjunction with the accompanying drawings, wherein:

FIG. 9 is a fragmentary, bottom plan view of one end of the bracing unit;

Figures 1, 2:
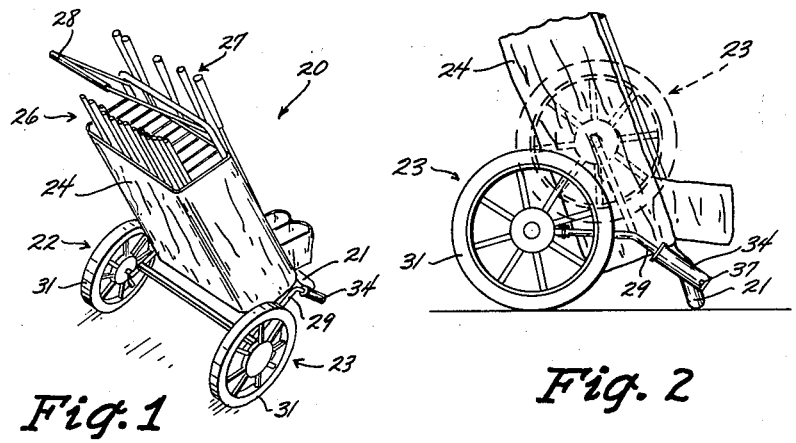
FIG. 1 is a perspective view of the golf club bag cart embodying this invention.
FIG. 2 is a fragmentary, side elevational view of the golf cart, showing a wheel device in a solid line ground-engaging position, and in a dotted line non-ground engaging position.

Referring now to the drawings, the golf cart of this invention is indicated generally at 20 in FIG. 1 and comprises basically a frame 21 mounted upon a pair of separate wheel devices 22 and 23, and having attached thereto a bag 24 for carrying a plurality of golf clubs, indicated generally at 26 and 27. A handle 28 is attached to the frame 21 for pulling the cart 20 over the ground when the wheel devices 22 and 23 are in their ground engaging positions of FIG. 2. For transportation and storage purposes primarily, the wheel devices 22 and 23 are each independently rotatably movable to non-ground engaging positions next to the bag 24 as best illustrated in dotted lines in FIG. 2.

Figures 3, 4:
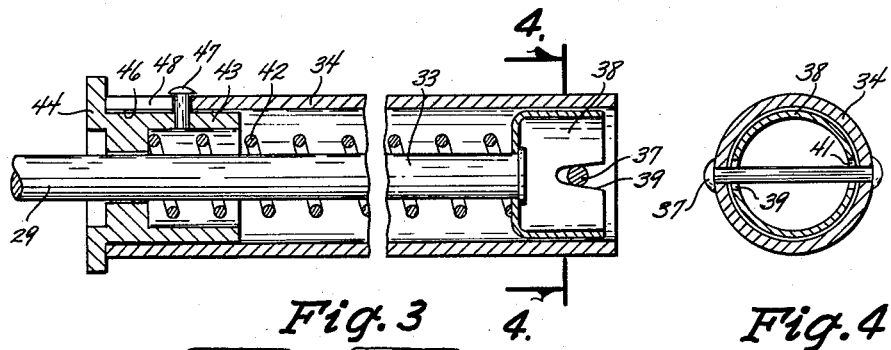
FIG. 3 is a fragmentary, enlarged sectional view taken along the longitudinal axis of a tube of a wheel device and showing the releasable connection between a wheel device and the golf cart frame.
FIG. 4 is a sectional view taken along the line 4—4 in FIG. 3.
Figure 5:
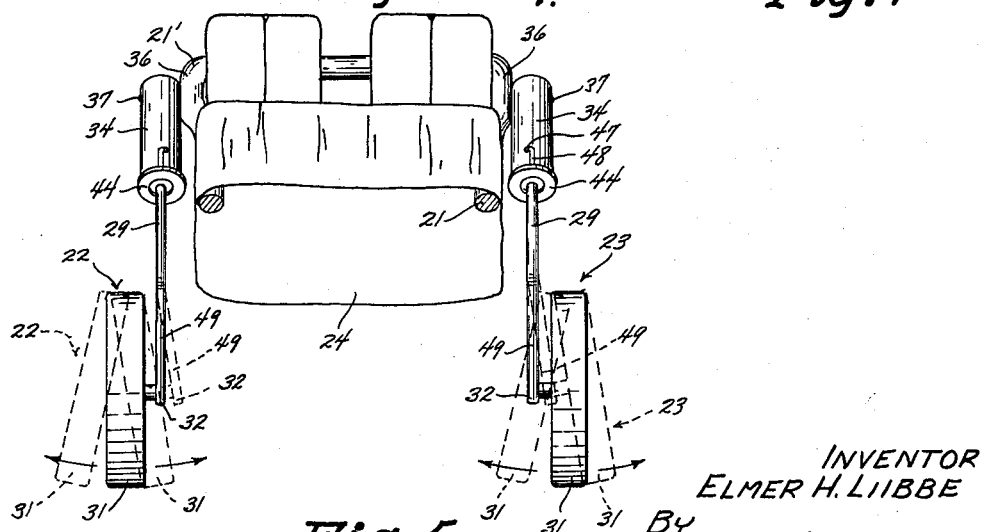
FIG. 5 is a top plan view of the base of the golf cart as depicted in FIG. 2, and showing by the use of dotted lines and arrows the lateral movement of the wheel devices possible in use without the provision of applicant's bracing unit.

Each wheel device 22 and 23 includes an angular shaft 29 (FIGS. 5 and 6) having a wheel 31 rotatably connected thereto at one end 32. The other end 33 (FIG. 3) is inserted into a tube 34 which is secured, as by welding, to the outer sides 36 (FIG. 5) of the lower end 21' of the frame 21. As best seen in FIGS. 2 and 5, the tubes 34 are parallel, and longitudinally extended relative to the frame 21 so that when the shafts 29 are properly inserted, the shafts 29 are perfectly straight in plan view (FIG. 5).

To connect the shaft inner ends 33 to the tubes 34 and thus to the frame 21, a journal pin 37 (FIGS. 3 and 4) is secured transversely across the lower end of each tube 34. Each journal pin 37 thus functions as the laterally extended end of an axle comprising the frame 21' and the tubes 34. The pins 37 are axially aligned. A circular, open socket 38 (FIGS. 3 and 4) is affixed to the shaft end 33 and has a pair of laterally spaced, transversely aligned notches 39 and 41 formed therein for receiving the pin 37.

A releasable connection is provided between each pin 37 and wheel device shaft socket 38 by a coil spring 42 (FIG. 3) one end of which engages the socket 38 and the other end of which engages the inner socket end 43 of a head 44 secured to the open end 46 of each tube 34 by a projection 47. As viewed in FIG. 5, and L-shaped slot 48 is formed in the tube end 46 for lockingly receiving the projection 47. Manual depression and rotation of the head 44 will enable the shaft end 33, head 44, spring 42, and socket 38 to be withdrawn as a unit from the tube 34.

This arrangement also provides each wheel device 22 and 23 to be disengaged from the locked position best suited for ground engagement and rotated 180° to the storage position, whereupon the socket 38 (FIGS. 3 and 4) again seats via the notches 39 and 41 against the journal pin 37. It will be seen by referring to FIG. 5 that this rotating movement on the part of each shaft 29 causes lateral movement of at least the outer angularly bent portion 49 of each shaft.

As a practical matter, as the only connection between each wheel device 22 and 23 and the frame 21 is the socket 38 receiving the journal pin 37, and as the only structure thus far described which prevents each wheel 31 and shaft 29 from axial rotation, commonly known to the user as "wobbling," is the two-point engagement of the pin 37 by the socket 38, it may readily be appreciated that both the socket notches 39 and 41 and the pin 37 will wear.

To retard the wearing of these particularly mentioned parts, to increase and extend their useful and effective life, to effect this by maintaining the wheels 31 and their shaft portions 49 (FIG. 5) against lateral swaying movement relative to the frame 21, a bracing unit 51 is particularly constructed.

As best shown in FIGS. 6–12, the unit 51 includes an elongated, metallic brace 52 and a pair of identical flexible grippers 53. The brace 52 is U-shaped in cross-section, although this is not critical, having a top wall 54 and a pair of side walls 56 and 57. Each end of each side wall is shaped in a concave manner at 58 and 59 for complementary engagement with the inner adjacent sides of the shaft portions 49.

The distance between the concavely shaped ends 58 and 59 is identical to the transverse spacing or distance between the convexly shaped shaft portions 49 when the shafts 29 and the portions 49 thereof are in perfect alignment and positions for true tracking of the wheels 31, as best illustrated in solid lines in FIG. 5. Thus, by effecting this contacting relation between the shaft portions 49 and the brace 52, lateral movement of the shaft portions 49 toward each other is prevented.

Figure 12:
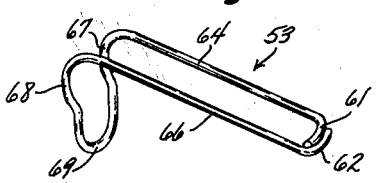
FIG. 12 is an enlarged perspective view of a spring member of the bracing unit.

To prevent lateral movement of the shaft portions 49 away from each other is the purpose of the flexible grippers 53. Each gripper is of a single piece of spring steel formed as best illustrated in FIG. 12. The ends 61 and 62 are overlapped in substantially the same plane and are interlocked (FIGS. 8 and 10) to each other and to the undersurface of the top wall 54 by a shoulder rivet 63. The legs 64 and 66 are sprung away from each other sufficiently so that they nestle against the inner surface of the side walls 56 and 57 (FIG. 9).

Figure 6:
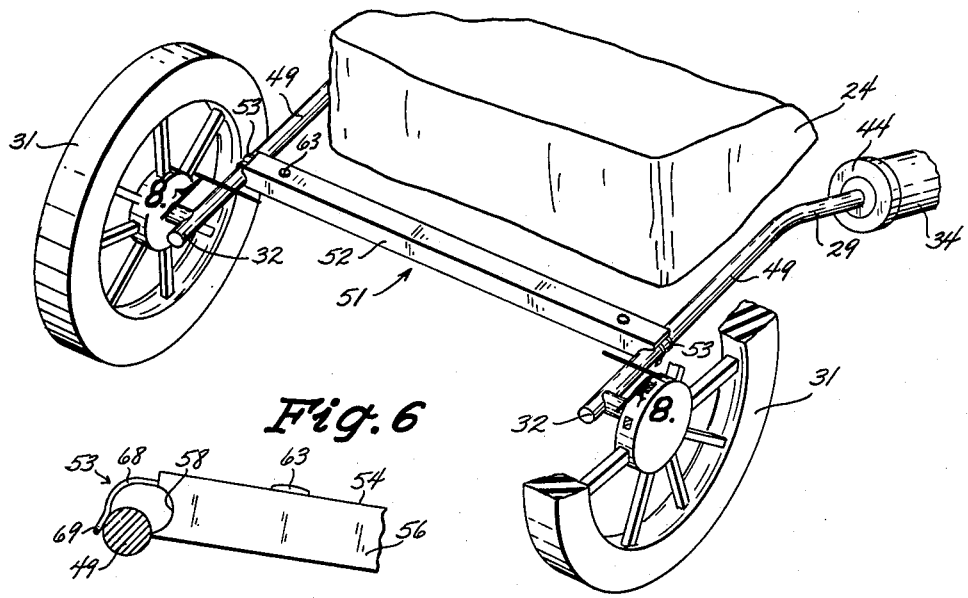
FIG. 6 is a fragmentary rear perspective view showing the assembled bracing unit.
Figure 7:
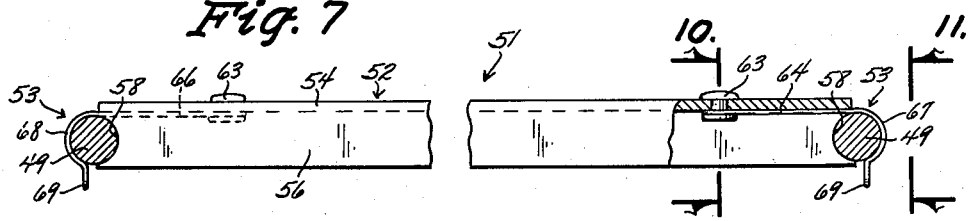
FIG. 7 is an enlarged elevational view of one end of the bracing unit just as it is either being attached to or removed from a wheel shaft, the latter shown in cross section.
Figure 8:
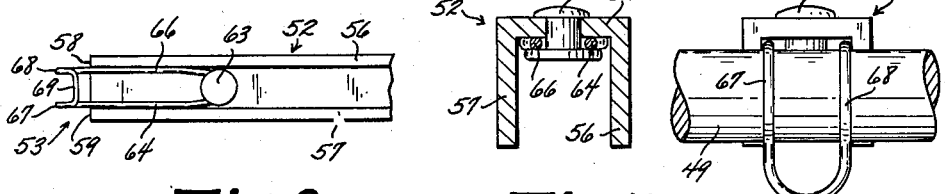
FIG. 8 is an enlarged, foreshortened, sectional view taken along the line 8—8 in FIG. 6, with certain parts shown in section and others broken away for clarity of illustration.
Figure 10:
FIG. 10 is an enlarged cross-sectional view taken along the line 10—10 in FIG. 8.
Figure 11:
FIG. 11 is an enlarged end elevational view as seen from the line 11—11 in FIG. 8.

The two bends 67 and 68 of the outer end of each gripper 53 are curved, as best illustrated in FIGS. 6 and 7, in a concave manner relative to the adjacent side wall ends 58 and 59, to form substantially a complete circle primarily in removing the bracing unit 51 from either or both shaft portions 49, the extreme tip 69 of each gripper 53 is angular with respect to the bends 67 and 68 to provide a finger gripping portion. As best illustrated in FIG. 11, the tip portion 69 depends sufficiently below a shaft portion 49 to enable a user's fingers to force the tip portion 69 outwardly from below the shaft portion, whereupon the brace 52 may be lifted upwardly and away from the shaft portion 49, as shown in FIG. 6.

In summation, an improved golf cart apparatus has been disclosed and described herein which is particularly adapted, when assembled and in use, to maintain the wheels and their shafts against lateral wobbling movement. The apparatus is easily disassembled from the remainder of the cart to enable the wheel devices to be moved to their storage and transportation positions.

It will be appreciated that although the wheel devices are maintained against lateral movement by the bracing unit, the wheel devices are permitted some relative vertical and axial movement by virtue of the flexible nature of the grippers relative to the shafts and also to each other. Thus, should one wheel device be forced higher or lower than the other, due to uneven terrain for example, limited knee action will not be prevented as the grippers will flex to accommodate the relative vertical movement. Also, should one wheel be bumped so that the coil spring within the tube is compressed, the particular wheel shaft will be permitted to move in an axial direction relative to the golf cart frame again by virtue of the flexible nature of the grippers.

Although a preferred embodiment of this invention has been disclosed hereinbefore, it is to be remembered that modifications and alternate constructions can be made relative thereto without departing from the true spirit and scope of the invention as defined in the apppended claims.

I claim:

1. A golf cart comprising in combination:
frame means;
axle means including a pair of transversely spaced tubes each open at one end and having a journal pin secured in the other end, said pins axially aligned;
separate wheel devices each including a shaft and a wheel rotatably mounted at one end thereof, the other end of each shaft inserted into one of said tubes through the open end thereof and releasably engaged with the journal pin therein, each wheel device movable in a lateral direction relative to said frame means from a ground engaging position to a non-ground engaging position; and
brace means including a solid, elongated element having a pair of laterally spaced walls, the opposed ends of each wall having a concave shape, and a flexible member secured to said element and extended outwardly from each end of said element, said member including a pair of laterally spaced arms each having a concave shape relative to said element wall ends and forming therewith a flexible band for releasably engaging a shaft, said brace means maintaining said wheel devices against lateral movement relative to said frame means.

2. A golf cart comprising in combination:
frame means;
axle means including a pair of transversely spaced tubes each open at one end and having a journal pin secured in the other end, said pins axially aligned;
separate wheel devices each including a shaft and a wheel rotatably mounted at one end thereof, the other end of each shaft inserted into one of said tubes through the open end thereof and releasably engaged with the journal pin therein, each wheel device movable in a lateral direction relative to said frame means from a ground engaging position to a non-ground engaging position; and
brace means including an elongated tubular element the opposite ends of which each have a concave shape relative to the remainder of said element, and a flexible member secured to said element and extended outwardly from each end of said element, said member including a pair of laterally spaced arms each having a concave shape relative to a respective element end and forming therewith a flexible band for releasably engaging a shaft, said brace means maintaining said wheel devices against lateral movement reltive to said frame means.

3. A golf cart comprising in combination:
frame means;
axle means including a pair of transversely spaced tubes each open at one end and having a journal pin secured in the other end, said pins axially aligned;
separate wheel devices each including a shaft and a wheel rotatably mounted at one end thereof, the other end of each shaft inserted into one of said tubes through the open end thereof and releasably engaged with the journal pin therein, each wheel device movable in a lateral direction relative to said frame means from a ground engaging position to a non-ground engaging position; and
brace means including a solid, elongated element having a pair of laterally spaced walls, the opposed ends of each wall having a concave shape, and a flexible member secured to said element and having a portion extended outwardly from each end of said element, said member portion having a concave shape relative to said element wall ends and forming therewith a flexible band for releasably engaging a shaft, said brace means maintaining said wheel devices against lateral movement relative to said frame means.

4. In a structure having a pair of spaced members movable in all directions relative to each other, brace means for maintaining said members against lateral movement relative to each other while permitting slight individual and relative vertical and longitudinal movement thereof, said brace means comprising in combination:
an elongated element having a pair of laterally spaced walls, the opposed ends of each wall having a concave shape, and a flexible member secured to said element and having a portion extended outwardly from each end of said element, said portion having a concave shape relative to said element wall ends and forming therewith a flexible band for releasably engaging a respective member.

References Cited by the Examiner
UNITED STATES PATENTS

| | | | |
|---|---|---|---|
| 643,610 | 2/00 | Schirra | 248—351 X |
| 2,760,782 | 8/56 | Hartzell | 280—36 |
| 2,858,140 | 10/58 | Stamp | 280—36 |

ARTHUR L. LA POINT, *Primary Examiner.*